United States Patent [19]
Strasser

[11] Patent Number: 5,446,248
[45] Date of Patent: Aug. 29, 1995

[54] CENTER-LOCK PORTABLE TRUCK SCALE

[75] Inventor: Thomas F. Strasser, Winter Springs, Fla.

[73] Assignee: First-Weigh Manufacturing, Inc., Sanford, Fla.

[21] Appl. No.: 975,088

[22] Filed: Nov. 12, 1992

[51] Int. Cl.⁶ .................. G01G 19/02; G01G 21/28; G01G 21/12; E05D 7/00

[52] U.S. Cl. .................. 177/134; 177/255; 177/DIG. 9; 177/244; 16/234; 16/270; 16/254; 16/319

[58] Field of Search ......... 177/126, 134, 255, DIG. 9, 177/244, 135; 16/234, 270, 319, 254

[56] References Cited

U.S. PATENT DOCUMENTS

| | | | |
|---|---|---|---|
| 1,051,538 | 1/1913 | Barcus | 16/270 |
| 3,444,942 | 5/1969 | Murphy | 177/126 |
| 3,747,716 | 7/1973 | Wilson | 177/134 |
| 3,935,914 | 2/1976 | Nordstrom et al. | 177/134 |
| 4,248,317 | 2/1981 | Rahav | 177/255 |
| 4,483,404 | 11/1984 | Weihs | 177/255 |
| 4,554,987 | 11/1985 | Dillon | 177/134 |
| 4,828,055 | 5/1989 | Hamilton et al. | 177/134 |
| 4,832,140 | 5/1989 | Häfner | 177/134 |
| 4,874,050 | 10/1992 | Strasser et al. | 177/134 |
| 4,949,798 | 8/1992 | Strasser et al. | 177/134 |

Primary Examiner—Benjamin R. Fuller
Assistant Examiner—Randy W. Gibson
Attorney, Agent, or Firm—Edward M. Livingston

[57] ABSTRACT

A center-lock portable truck scale has an end positioning post (4) between sides at ends of a truck scale and a central positioning post (8) positioned centrally in truck-scale sections. Positioning rods (5 and 9), preferably bolts, form positioning bumpers at adjustable distances from the lock posts. Hinges (23, 29 and 49) are employed to connect sides of the scale bridge (11, 12) so that large truck scale decks may be foldable for easy transportation to the site of installation. Scale loading weight is carried on a vertical load-cell pillar (75) that rests pivotally on a load button (77) that is positional in a load-button indentation in a top surface of strain-gauge beams (80). The central positioning post and positioning bolts prevent excessive end-to-end movement while the end positioning posts prevent excessive side-to-side or twisting movement of a scale unit, thereby positioning scale weight directly on load cells (3) in jarring and temperature-change use-conditions for more accurate weighing.

40 Claims, 12 Drawing Sheets

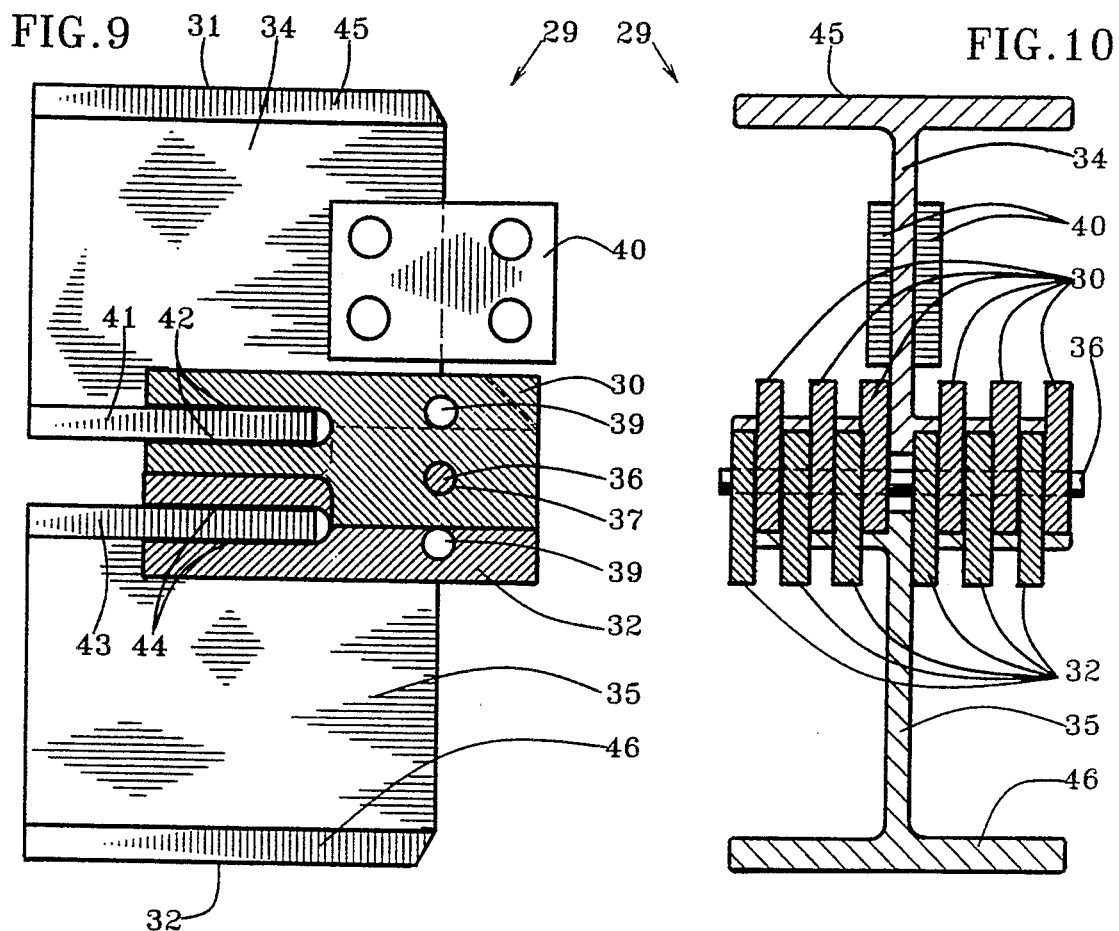

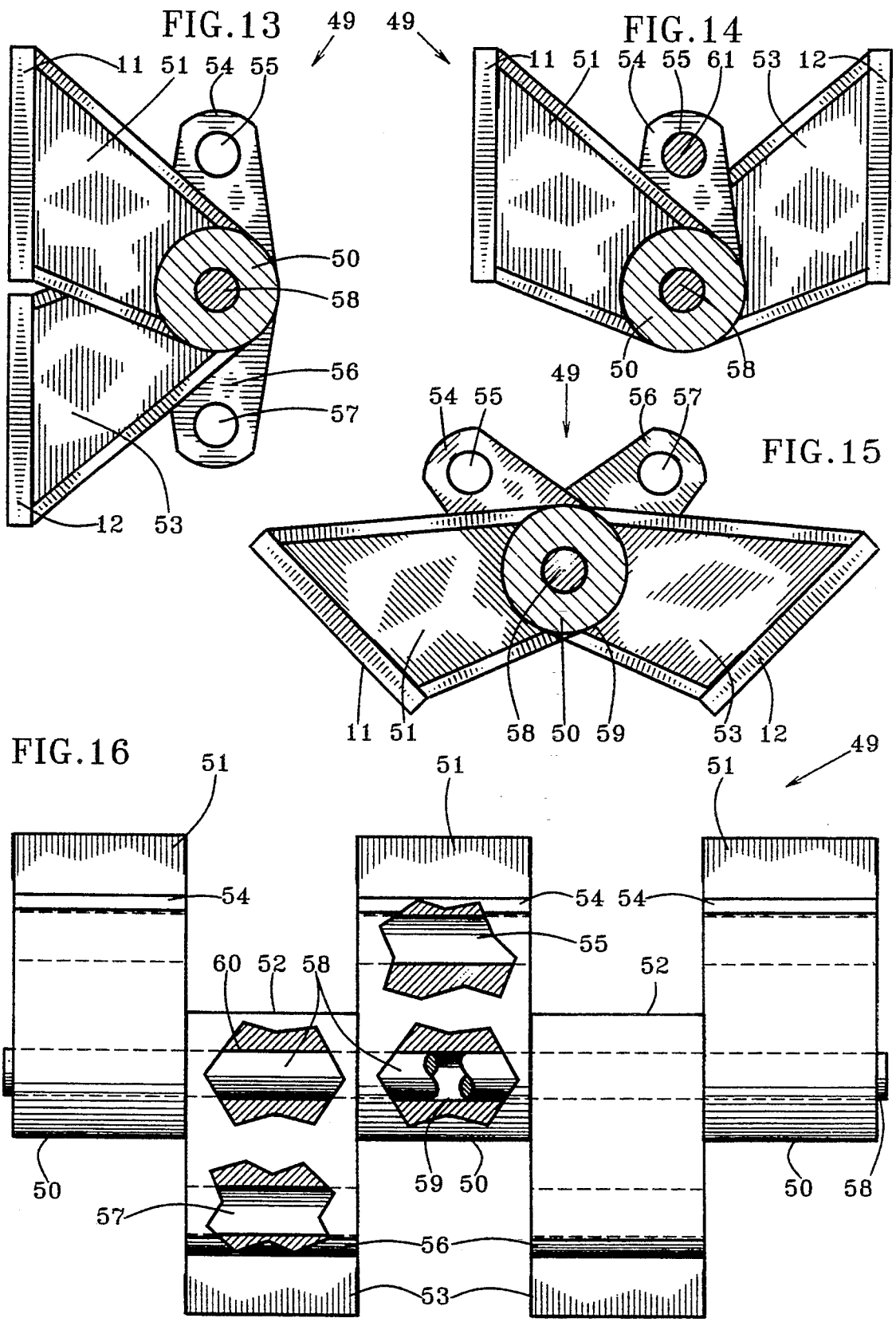

CENTER-LOCK PORTABLE TRUCK SCALE

BACKGROUND OF THE INVENTION

This invention relates to truck scales and more particularly to truck scales which can be transported in foldable sections to a site and then center-locked into position.

Increase in size of trucks and use of strain gauges to replace prior weight measurement devices have been two main factors affecting development of truck scales. Basically, a modern truck scale is a bridge or a series of bridge units suspended on a strain-gauge load cell to measure weight at opposite ends of each bridge unit.

Examples of different but pertinent prior art are described in the following patent documents.

| COUNTRY | NUMBER | DATE | NAME |
| --- | --- | --- | --- |
| U.S. | 4,949,798 | Aug. 21, 1990 | Strasser, et al. |
| U.S. | 4,874,050 | Oct. 17, 1989 | Strasser, et al. |
| U.S. | 4,828,055 | May 9, 1989 | Hamilton, et al. |
| U.S. | 3,935,914 | Feb. 3, 1976 | Nordstrom, et al. |
| U.S. | 3,444,942 | May 20, 1969 | Murphy |

The two Strasser, et al. patents described bridge-support technology applicable particularly to weigh bridges, but did not teach the center-lock features nor the less expensive beam technology employed in the present invention. Rather, the latter patented devices employed means for transmitting load to a load cell that are more difficult to inspect and repair, less reliable and more expensive to construct and assemble than the means employed in this invention. The Hamilton patent taught a bolt linkage system that is very different from a hinge linking mechanism taught by this invention. Hamilton did not have a central locking means taught by this invention to decrease costs of construction and increase portability. The Nordstrom, et al. patent taught a three-point suspension system for measuring what it called "overturning moments" resulting from unbalanced loading of trucks. Murphy taught modular bridges in a plurality of patents, including the one listed. In conclusion, none of the prior patents teach central locking, hinging or load-cell mounting means employed by this invention.

Furthermore, previous truck scales have been anchored at sides and ends by various types of wall structures. Such wall structures are large, expensive and difficult to transport. Some must be built largely on site. Equally important, such truck scales are not reliable because of expansion and contraction due to temperature changes. For instance, making the scales tight enough for hot weather makes them too loose for cold weather. The latter size differential caused by expansion and contraction of metal due to temperature changes results from a relatively long distance between sides and between ends.

Heretofore, advantages of a reliable hinge system for folding bridge units for foldability has not been recognized. Most have been so heavy that sectioning them into pieces has been the main method for achieving portability. Consequently, a rigid type of hinge employed in this invention was not used in the prior art.

Additionally, convenient removal and replacement of load cells to check and adjust them for accuracy as provided by this invention were not available in the prior art, nor was a sturdy and long-lasting attachment means for load cells having these advantages.

SUMMARY OF THE INVENTION

A major object of the present invention is to make it possible to fold sections of truck scales for transportation on standard truck beds at lower cost than for transporting unfolded and assembled sections on special low-bed trailers.

Another object of the present invention is to lock scale bridges securely in position while yet allowing for slight movement to absorb shock and avoid structural fracture from heavy truck movement.

Yet another object of the present invention is to decrease wear, breakdown and adjustment requirements of scale-bridge positioning means.

A further object of the present invention is to convey weight to a strain-gauge load cell for weight measurement accurately under conditions of vibration and jarring movement of a scale bridge.

An even further object of the present invention is to assure maximum strength of a mounting base for a strain gauge.

Another object of the present invention is to provide truck scales that can be produced in sections for use individually for short trucks and mining cars or assembled in multiple-unit long scales for long highway trucks with a plurality of vehicle units.

An additional object of the present invention is to make repair, maintenance and accuracy adjustment of load-cell strain gauges convenient, fast and low in cost.

This invention accomplishes the above and other objectives with a center-lock portable truck scale having a central lock post positioned centrally between sides and ends of a truck scale and end lock posts positioned at ends of truck-scale sections. Positioning rods, preferably in the form of positioning bolts, are positional selectively in bumper bases adjacent opposite end-abutment walls of the central lock post and adjacent opposite side-abutment walls of the end lock posts. Heads of the positioning bolts form positioning bumpers at adjustable distances from the lock posts. A beam hinge with a plurality of interlocking walls is used as an option to join linear halves of bridge sections in foldable relationship for transportation and to maintain the linear halves in rigid parallel relationship when installed. Strain-gauge beams are supported with a beam pin inserted through a beam orifice in a bottom portion of each end of each strain-gauge beam. The beam pins rest in a groove in each end of a load-cell saddle. Scale loading weight is carried on a vertical load-cell pillar that rests pivotally on a load button that is positional in a load-button depression in a top surface of each strain-gauge beam. The central lock post and positioning bolts prevent excessive end-to-end movement while the end lock posts prevent excessive side-to-side or twisting movement of a scale unit. The latter feature positions scale weight directly on the load cells accurately and reliably in the jarring and temperature-change conditions associated with movement of heavy trucks on large scale platforms.

BRIEF DESCRIPTION OF THE DRAWINGS

This invention is described by appended claims in relation to description of a preferred embodiment with reference to the following drawings wherein:

FIG. 9 is a side view of an end section of the folded hinge illustrated in FIGS. 6–8;

FIG. 10 is an end view of the FIG. 9 illustration;

FIG. 11 is a sectional view of a side of a foldable scale bridge unit attached to an unfolded hinge with a U-beam construction;

FIG. 12 is a sectional view of a side of a foldable scale bridge unit attached to an unfolded hinge with an I-beam construction;

FIG. 13 is a sectional side view of a folded optional juxtaposed-sleeve hinge employed between foldable sides of foldable scale units;

FIG. 14 is a sectional side view of an unfolded juxtaposed-sleeve hinge illustrated in FIG. 13;

FIG. 15 is a sectional side view of the juxtaposed-sleeve hinge of FIGS. 13–14 in partially unfolded mode;

FIG. 16 is a cutaway end view of the FIG. 13 illustration;

DESCRIPTION OF PREFERRED EMBODIMENTS

Figure 1:
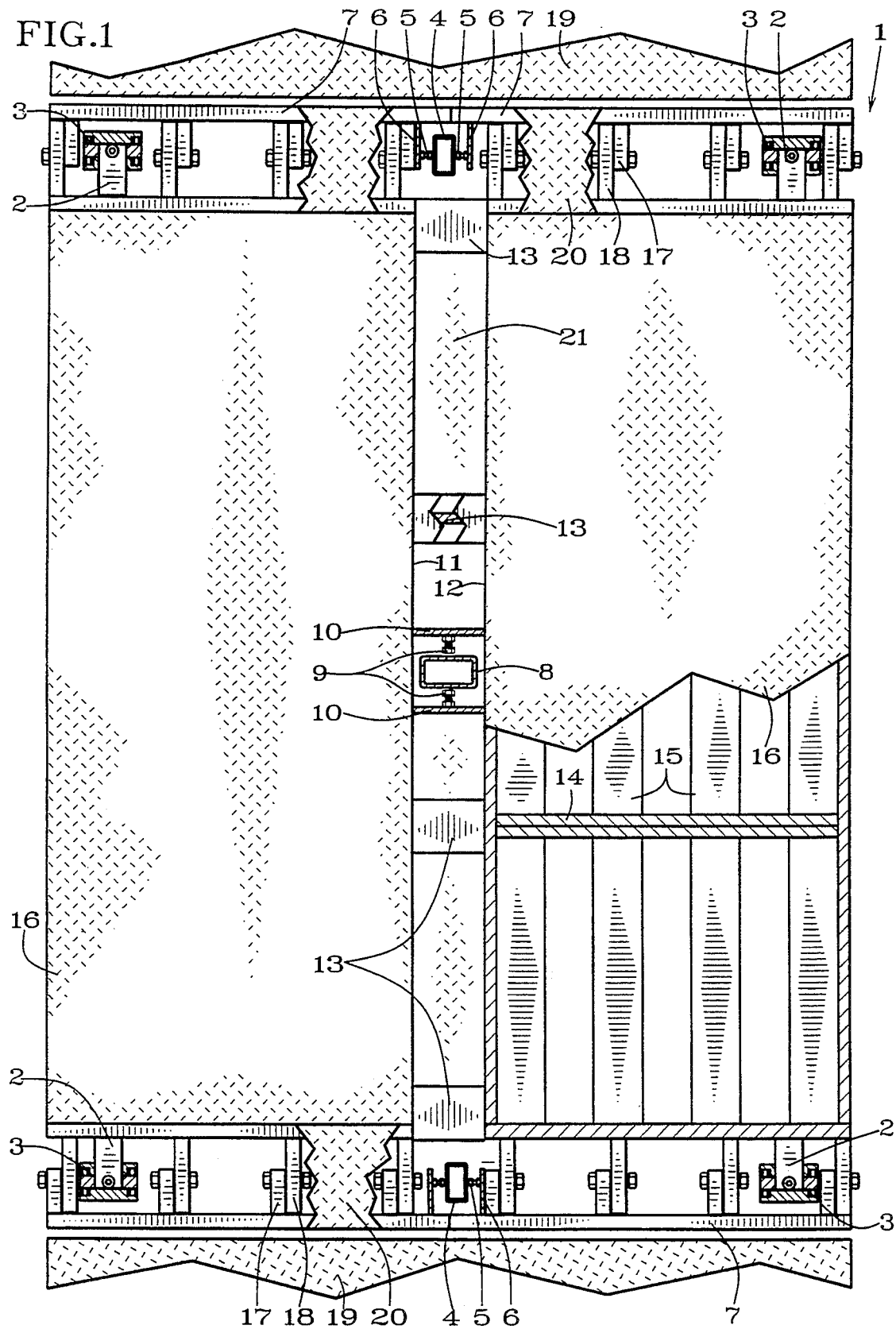
FIG. 1 is a partial cutaway top view of a rigid single-unit embodiment of this invention useable primarily for short trucks and mining cars.

Reference is made first to FIG. 1. A non-foldable single-unit scale bridge 1 is supported by bridge supports 2 from which scale weight is transmitted to load cells 3 proximate each corner of the scale bridge 1. Scale weight is positioned laterally from side-to-side on the load cells 3 by end positioning post 4 at each end of the scale bridge 1. Side-to-side positioning rods 5, also referred to as bumper bolts, are adjustable for positioning lateral travel of ends of the scale bridge 1 in relation to the end positioning post 4. The bumper bolts 5 are attached to bumper bases 6 on cross members of end-joint framework 7 on each end of the scale bridge 1. Scale weight is positioned linearly from end-to-end on the load cells 3 by central positioning post 8 and an end-to-end positioning rod or bolt 9. The end-to-end positioning bolt 9 is attached to central bumper bases 10 which are attached to the scale bridge 1.

The scale bridge 1 has a scale bridge side one 11 and scale bridge side two 12 which can be joined rigidly by side-joining members 13 for non-foldable scale units 1. A section of an I-beam is illustrated as a side-joining member 13 in this non-foldable embodiment. Various forms of lateral or side-to-side beams 14 can be extended between opposites sides of each scale bridge side 11 and 12. Linear or end-to-end beams 15 can be interspaced and extended between the lateral beams 14. A deck plate 16 is positional on top of beams 14 and 15 as a working surface.

End-joint attachment members 17 are extended from the cross members of end-joint frameworks 7 and attachable to scale attachment members 18 on end-joint frameworks 7 of adjoining scale units. End ramps 19 also can be positioned next to the end-joint framework 7. End-joint decking 20 can be positioned on the attachment members 17 and 18 or on ends of scale bridge sides 11 and 12 as a working surface at end joints. Center decking 21 can be placed over space between scale bridge sides 11 and 12 which are joined by side-joining members 13.

Detail not shown in this illustration is described in relation to subsequent drawings. The positioning posts 4 and 8 are attached to foundations illustrated and described in relation to FIGS. 17–21. Further description of the load cell 3 means for positioning the scale weight on them are provided in relation to FIGS. 22–27. Hinges for optional folding of the scale bridge 1 for transportation are described in relation to FIGS. 6–16.

Figure 2:
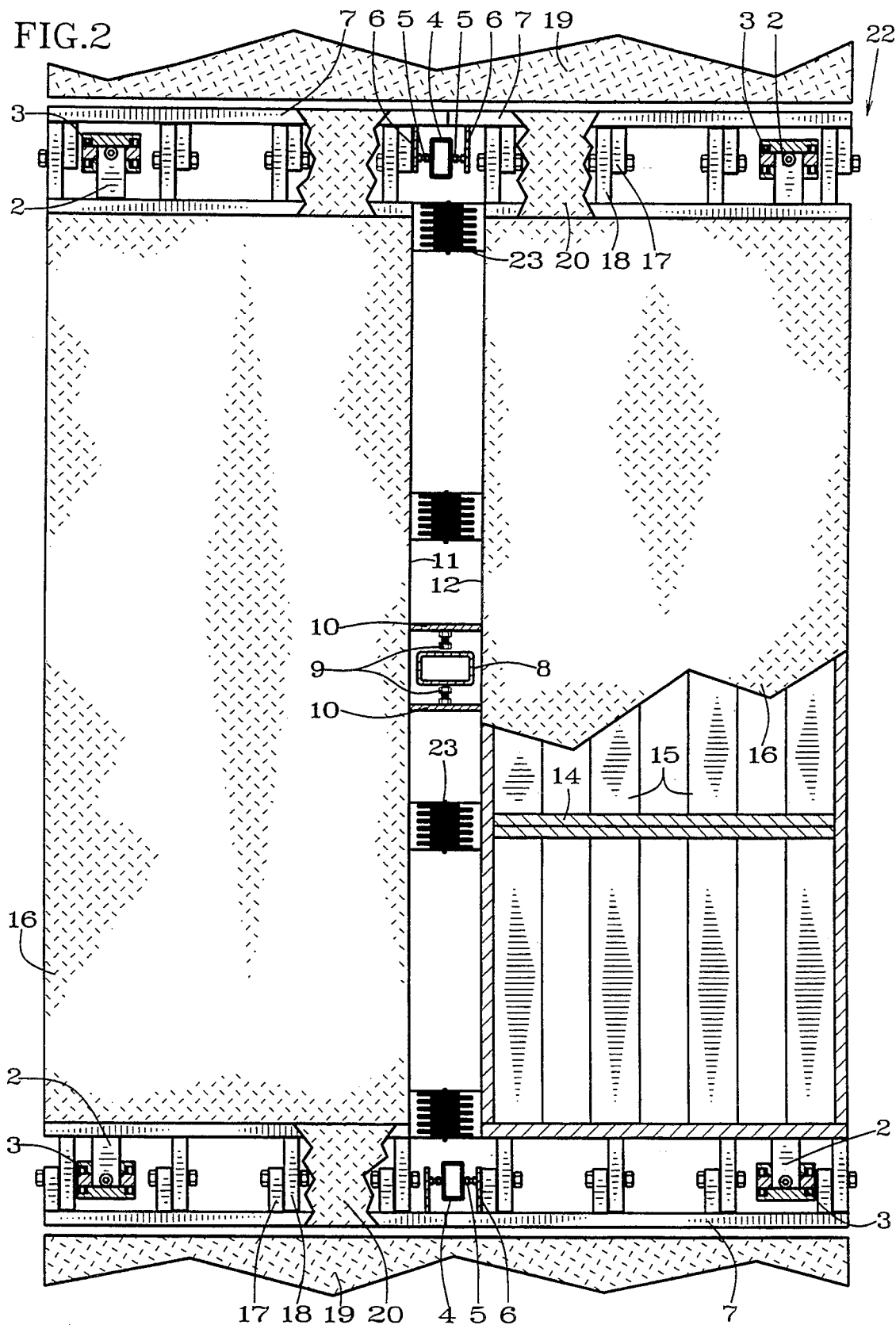
FIG. 2 is a partial cutaway top view of a foldable single-unit embodiment of this invention useable primarily for short trucks and mining cars.

Referring to FIG. 2, a foldable single-unit scale bridge 22 is largely the same as non-foldable single-unit scale bridge 1 described in relation to FIG. 1 except for its two sides 11 and 12 being joined by scale bridge hinges 23 and related factors described in relation to FIGS. 6–16. Foldability allows use of less expensive vehicles and handling means for transport of the scale bridge units from a fabrication plant to a use site. It also facilitates moving which makes re-use of the scale bridges economical. Lower initial cost and an equivalent of a higher "turn-in value" for re-use make this scale system far less expensive than other types of truck scales.

Figure 3:
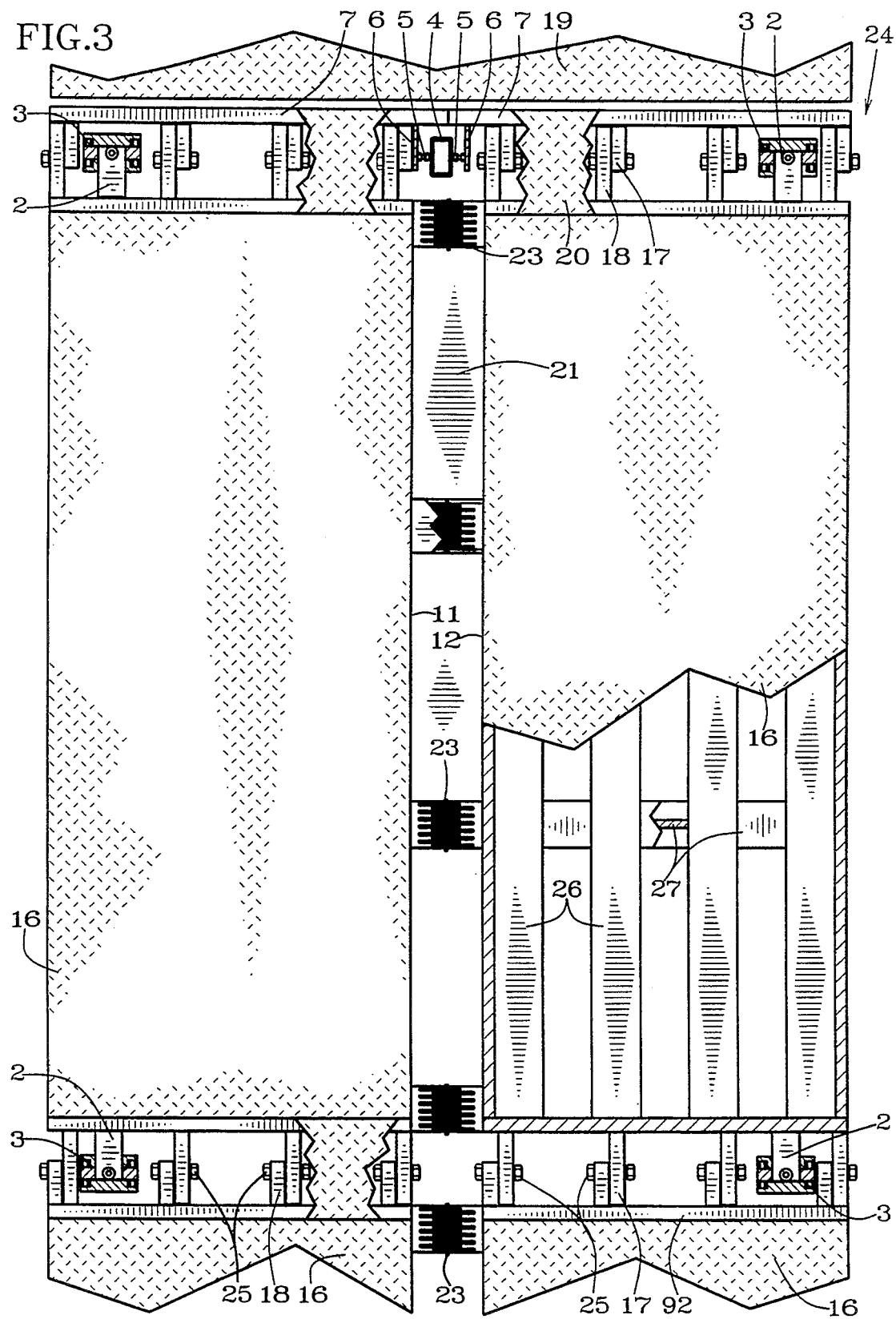
FIG. 3 is a partial cutaway top view of a foldable end section of a multiple-unit embodiment of this invention.

Referring to FIG. 3, a foldable multiple-unit scale bridge 24, used for weighing long trucks, is formed by end-to-end attachment of a plurality of single-unit scale bridges 22 of FIG. 2 instead of positioning an end ramp 19 on opposite ends of a single bridge unit to form a short-truck single-unit scale. Scale-unit attachment members 17 and 18 are offset laterally can be provided with vertically-swivelable fasteners 25 having axes that are concentric with other fasteners 25 between the same adjoining units. The fasteners 25 are concentric also with load cells 3. Typically, the fasteners 25 do not extend outside of attachment members 17 and 18 as shown for illustration only. The bridge support members 2 are offset vertically with one above the other in overlapping arrangement in order to transmit weight of each pair of adjoining scale units onto the same load cell 3 at each corner of the adjoining units. As a construction alternative for the opposite parallel sides 11 and 12 of each scale unit, end-to-end linear beams 26 and interspaced lateral beams 27 can be employed instead of the side-to-side lateral beams 14 and interspaced linear beams 15 illustrated in FIGS. 1 and 2.

Figure 4:
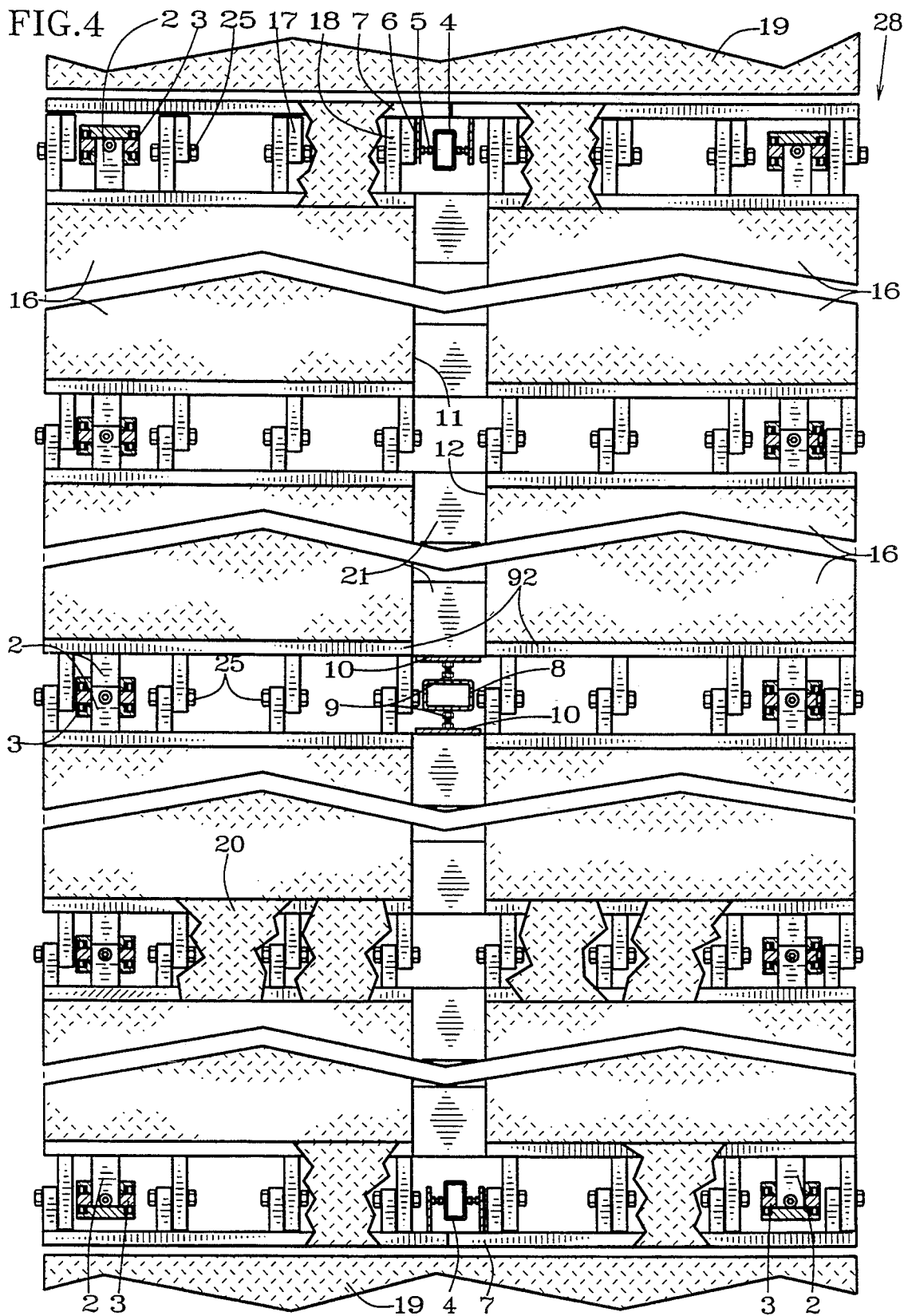
FIG. 4 is a partial cutaway top view of adjoining sectional views of a complete multiple-unit embodiment of this invention.

Referring to FIG. 4, a scale bridge constructed according to this invention in a multiple-unit truck scale 28 has four single units shown in broken sections joined end-to-end as described in relation to FIG. 3. The single units can be non-foldable as described in relation to FIG. 1 or foldable as described in relation to FIG. 2. The central positioning post 8 is placed between ends of central adjoining units with the end-to-end positioning rods or bolts 9 extended from central bumper bases 10 which are attached to adjoining intermediate-joint frameworks 92. Thus, all four units are prevented from traveling beyond normal heat expansion and contraction distances linearly by central positioning post 8 and laterally by end positioning posts 4. The entire length of scale is positioned with weighing sections on load cells 3 with only three positioning posts, one at each end and one in the center. There is no seesaw effect between scale ends and there is reliable all-weather positioning.

Figure 5:
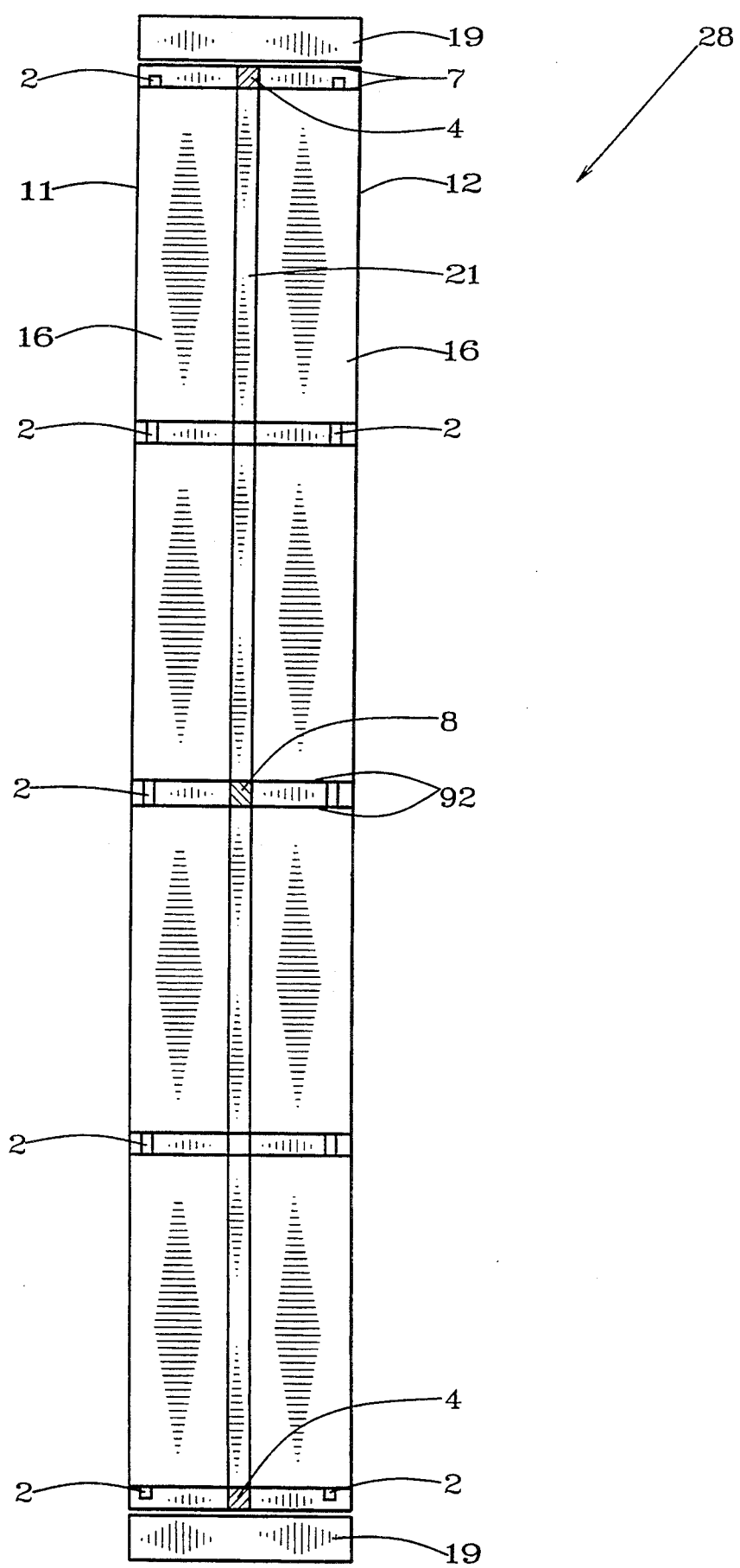
FIG. 5 is a top plan view of the FIG. 4 illustration.
Figure 6:
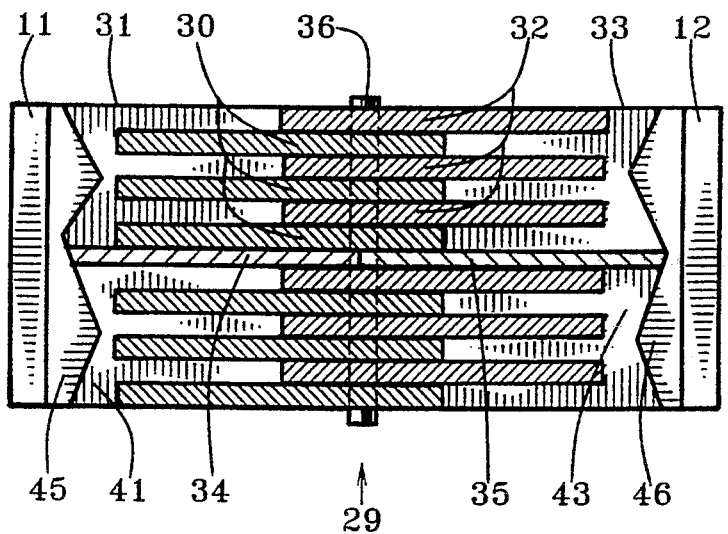
FIG. 6 is a sectional top view of a juxtaposed-plate hinge employed in the foldable scale unit which is one subject of this invention.
Figure 7:
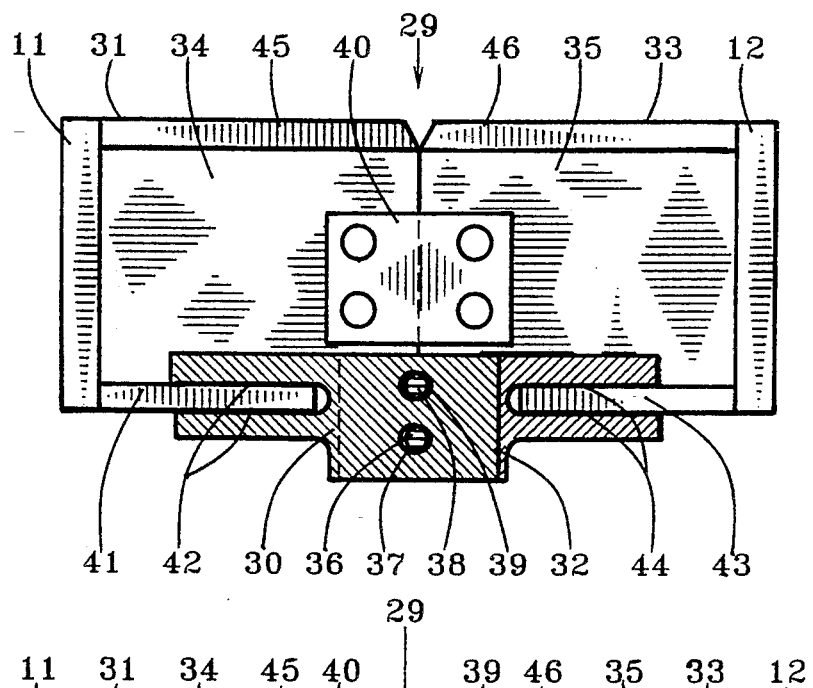
FIG. 7 is a sectional side view of the FIG. 6 illustration.
Figure 8:
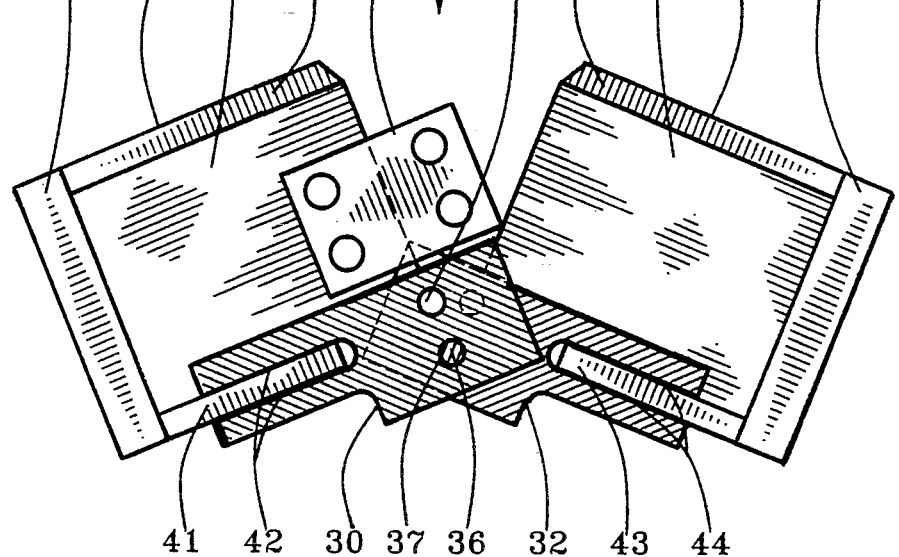
FIG. 8 is a sectional side view of the FIG. 7 illustration in a partially-folded mode.

Referring to FIG. 5 primarily and to FIGS. 1–4, a typical multiple-unit truck scale 28 can be over 70 feet long between optional end ramps 19. It can be 11 feet wide or more. Each parallel opposite side 11 and 12 can be approximately 5 feet wide and the joining section 21 can be approximately one foot wide. Each section can be approximately 17.5 feet long to provide the 70 feet required for present highway trucks. The end positioning posts 4 are at centers of ends and the central positioning post 8 is at a center between adjoining units. Bridge support units 2 are positioned over load cells 3 as shown in FIGS. 1–4 and in FIGS. 22–27. The length and width of each module and the resulting total length can vary, depending on use requirements.

Referring to FIGS. 6–10, a plate type of bridge hinge 29 has side-one hinge plates 30 attached to side one 31 and side-two hinge plates 32 attached to side two 33. Hinge plates 30 and 32 are juxtaposed in relation to each other and provided with smooth, slidable-contact surfaces between adjoining edges for linear rigidity of the hinge 29. Sides 31 and 33 can be I-beams with legs 34 and 35 attached to central adjoining hinge plates 30 and 32. A hinge pin 36 is insertable in hinge-pin orifices 37 when the hinge-pin orifices 37 are concentric. A lock pin 38 is insertable into lock-pin orifices 39 when the sides 11 and 12 of the bridge are unfolded in a common plane for operational mode and the lock-pin orifices 39 are concentrically in-line. I-beam guides 40 can be attached to opposite sides of side-one I-beam leg 34 to provide additional rigidity when I-beam leg 35 is between them snugly in an unfolded, operational mode of bridge hinge 29. A side-one I-beam bottom cross member 41 is affixed to opposite sides of side-one attachment grooves 42. In a like manner, a side-two I-beam bottom cross member 43 is affixed to opposite sides of side-two attachment grooves 44. Side one 31 of hinge 29 is affixed to side one 11 of a foldable bridge unit at a cross section of side-one having top cross member 45, I-beam leg 34 and I-beam bottom cross member 41. Side two 33 of hinge 29 is affixed to side two 12 of the foldable bridge unit at cross sections of side-two having side-two top cross member 46, I-beam leg 35 and I-beam bottom cross member 43. Lock pin 38 is inserted in the unfolded, operational mode of FIGS. 6 and 7, although not shown in FIG. 6. The lock pin 38 is absent in a folding or unfolding mode of FIG. 8 and in the unfolded modes of FIGS. 9 and 10.

Referring to FIG. 11, a "U-beam" type of construction of a side one 11 is attached to hinge 29. U-beams 47 are interspaced between lateral beams 14 in the relationship illustrated in FIGS. 1 and 2. The U-beams can be constructed at a fabrication site with costs savings over standard beams and with design flexibility advantages of select plating for different sizes and types of scale units.

Referring to FIG. 12, an optional I-beam type of construction of side one 11 with interspaced I-beams 48 is attached to hinge 29 for standardized construction with lateral beams 14 in the structural relationship shown in FIGS. 1 and 2.

Referring to FIGS. 13–16, a sleeve type of bridge hinge 49 has side-one hinge sleeves 50 attached to side-one hinge bases 51 and side-two hinge sleeves 52 attached to side-two hinge bases 53. The side-one hinge sleeves 50 are juxtaposed in relationship to the side-two hinge sleeves 52 and the respective hinge bases 51 and 53. A side-one lock-pin boss 54 having a side-one lock-pin orifice 55 is extended from each side-one hinge sleeve 50 and a side-two lock-pin boss 56 having a side-two lock-pin orifice 57 is extended from each side-two hinge sleeve 52. Side-one hinge bases 51 are affixed to side one 11 and side-two hinge bases 53 are affixed to side-two 12 of scale units 22, 24 and 28 of FIGS. 2, 3, 4, and 5. A hinge pin 58 is insertable into side-one hinge-pin orifices 59 and into side-two hinge-pin orifices 60 when the hinge-pin orifices are in-line concentrically. A lock pin 61 is insertable into lock-pin orifices 55 and 57 when such lock-pin orifices are concentric, the hinge-pin orifices 59 and 60 are concentric and sides 11 and 12 are in a common plane as illustrated in the unfolded mode of FIG. 14. When the hinge 49 is being folded or unfolded as shown in FIG. 15, or when the hinge 49 is fully unfolded as shown in FIGS. 13 and 16, the lock pin 61 is removed.

Bridge hinge 49 differs mostly from bridge hinge 29 in proportions of components. Increase in width of plates 30 and 32 in bridge hinge 29 renders the plates 30 and 32 into sleeve forms and vice versa. In a sleeve embodiment, the hinge 49 utilizes circumferential perimeters of hinge-pin orifices 59 and 60 instead of parallel surfaces of plates 30 and 32 for providing structural integrity and rigidity of a hinge relationship. For the sleeve embodiment 49, the hinge pin 58 must be larger to provide contact surface for rigidity in addition to shear strength. Which hinge to employ, 29 or 49, is a trade-off factor determinable mostly by fabrication costs for milling surfaces of plates 30 and 32 in addition to turning inside diameters of hinge-pin orifices 37 and outside diameters of hinge pins 36. This is compared to costs for turning only inside diameters of hinge-pin orifices 59 and 60 and the outside diameter of hinge pins 58. Contact ends of hinge sleeves 50 and 52 must be milled the same as surfaces of hinge plates 30 and 32. But accuracy requirement is far less and there is less surface area to mill on hinge sleeves 50 and 52. Lock-pin orifices 39, 55 and 57 require boring for either hinge selection.

Figure 17:
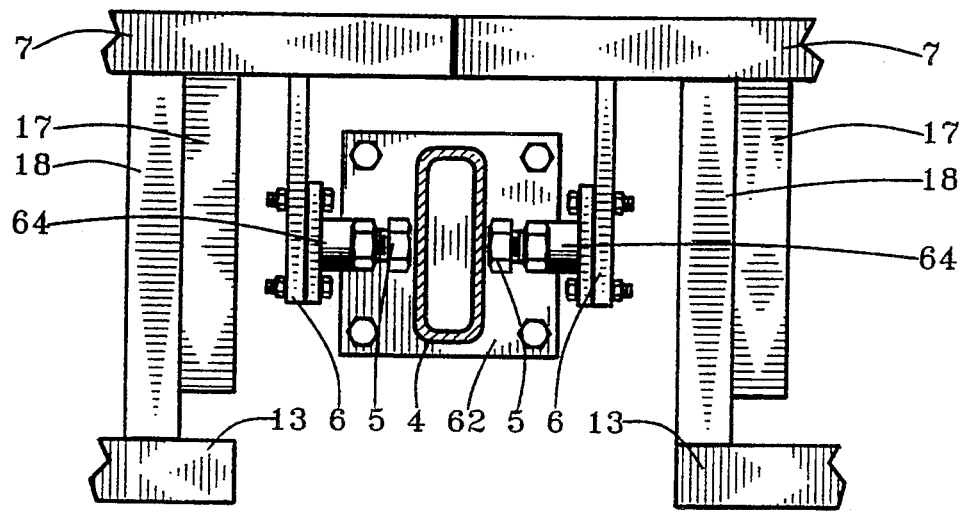
FIG. 17 is a sectional top view of a side-to-side positioning post in relationship to an end of a bridge unit.
Figure 18:
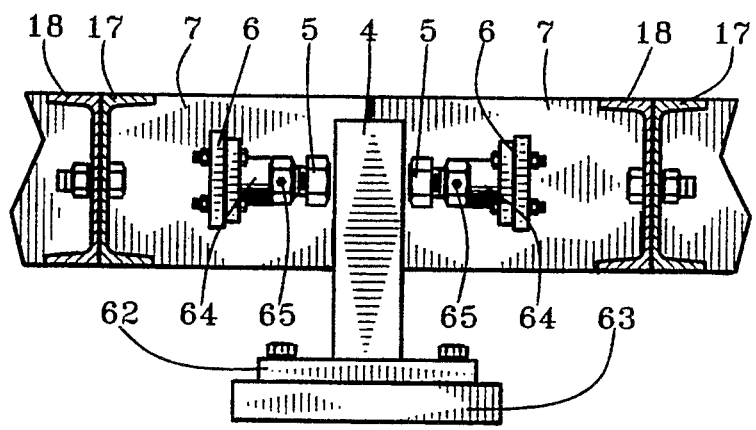
FIG. 18 is a sectional elevation view of a side-to-side positioning post in relationship to an end of a bridge unit.
Figure 19:
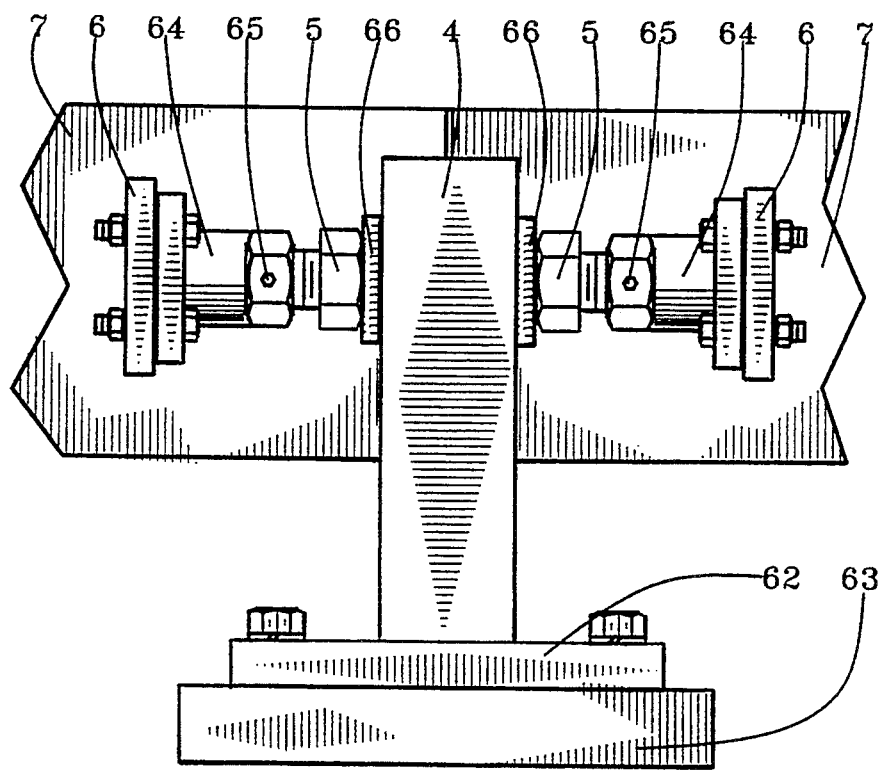
FIG. 19 is an enlarged section of the FIG. 18 illustration showing an optional resilient cushion positional between bumper units and a side-to-side positioning post.

Referring to FIGS. 17-19, the end positioning post 4 is affixed to a lateral positioning foundation 62 vertically in a central position below each end of a single-unit scale bridge, either 1 or 22, or below each end of a multiple-unit scale bridge, either 24 or 28. The lateral positioning foundation 62 is attached to a lateral composite foundation 63 on which the scale bridge in placed for use. The side-to-side positioning rod or bolt 5 is preferably a bolt with threads screwable into threads of a positioning sleeve 64 with a lock screw 65 to prevent it from rotating in the absence of other thread-locking mechanism. A select distance between a head of the positioning bolt 5 and the end positioning post 4 is allowed to permit side-to-side heat expansion and contraction of a portion of the end-joint framework between bumper bases 6 with which the positioning bolts 5 and positioning sleeves 64 are attached to scale bridge units. With this lateral positioning system, it is not necessary to provide for heat expansion and contraction of an entire width of a scale between positioning members as is required in conventional positioning systems. Also, side travel resulting from impact on an entire scale or on ends of a scale in opposite lateral directions or in the same lateral direction from a select position in relation to load cells 3 is arrested. A resilient cushion 66 is positional optionally between the positioning bolts 5 and the positioning posts 4. If used to prevent minimal impacting contact of use-conditions, the resilient cushion 66 can be attached to either the positioning posts 4 or the positioning bolts 5.

Figure 20:
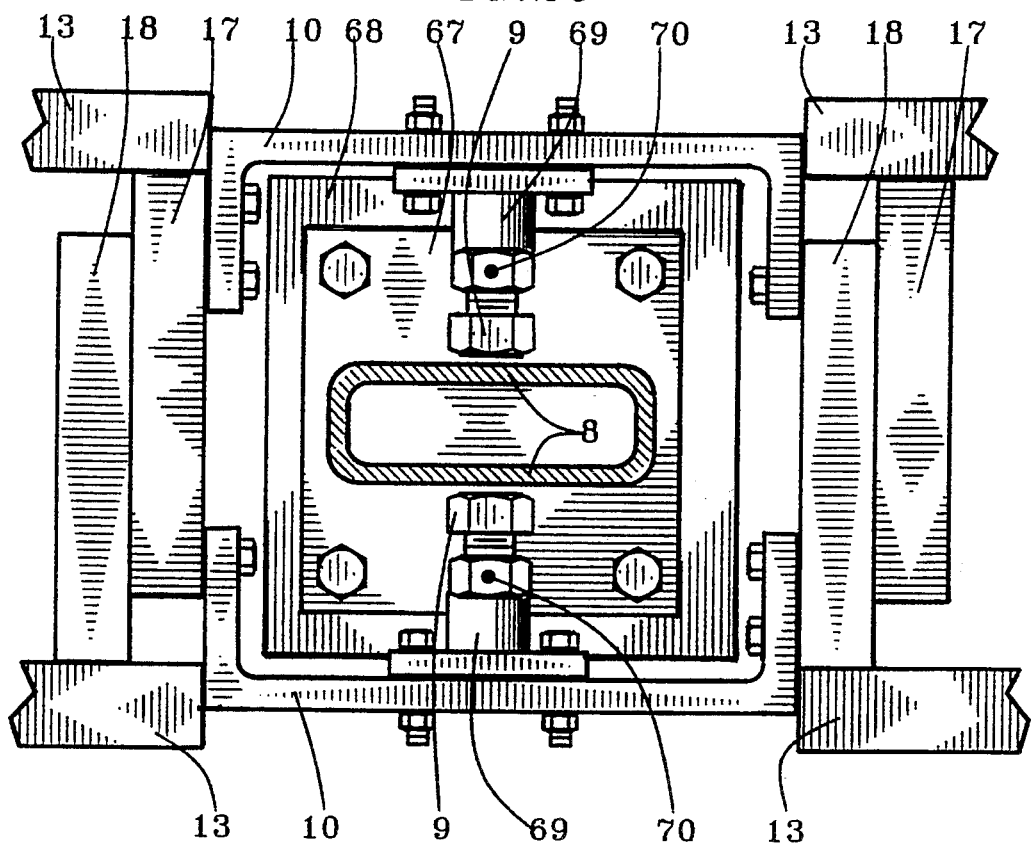
FIG. 20 is a top view of an end-to-end positioning post in relationship to adjoining ends scale bridge units.
Figure 21:
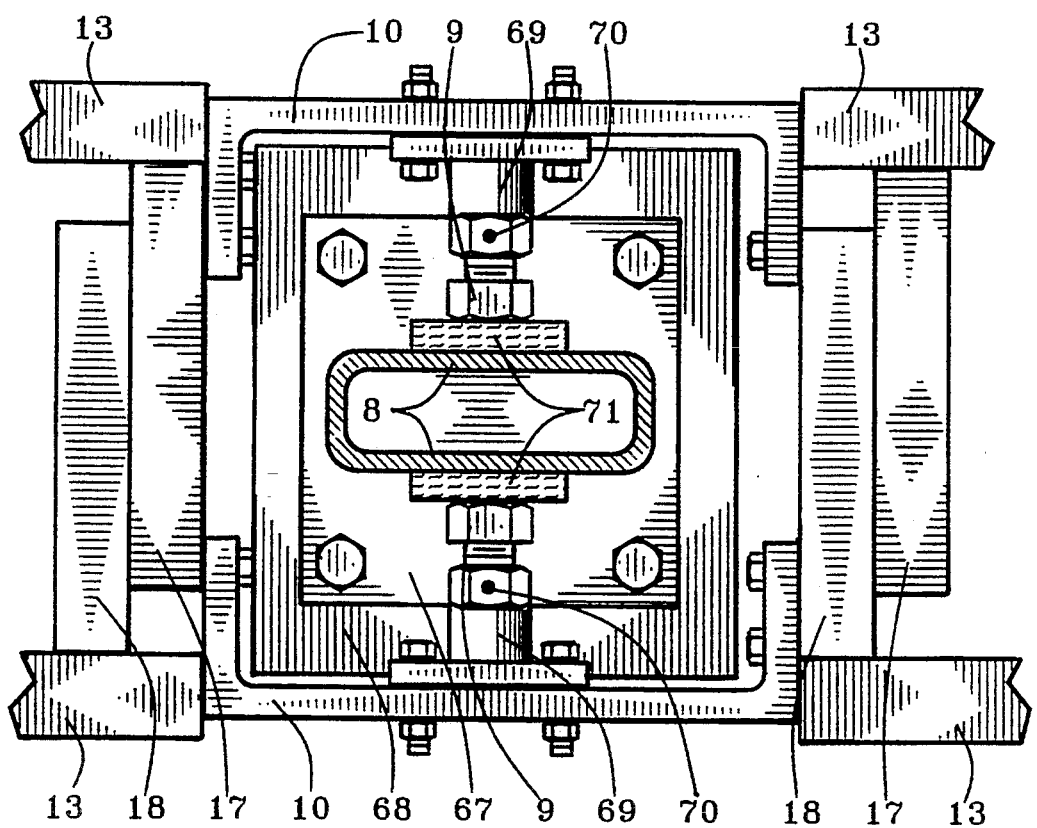
FIG. 21 is the FIG. 20 illustration employing a resilient cushion between the positioning post and bumper members.
Figure 22:
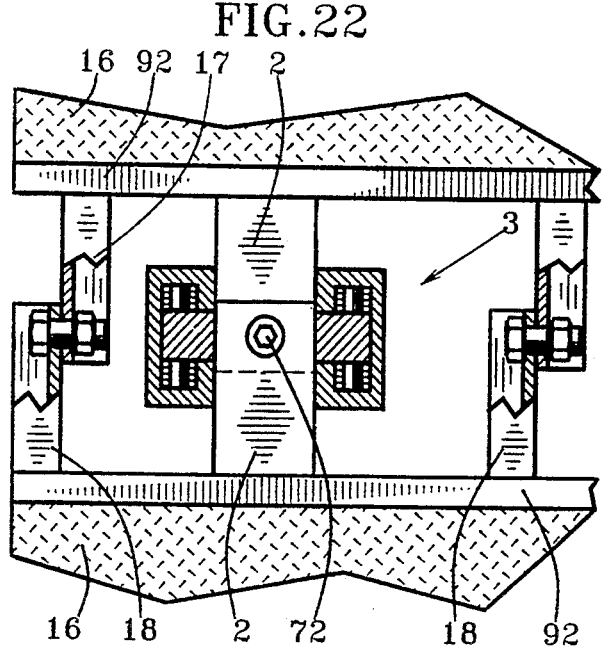
FIG. 22 is a sectional top view of bridge support members of adjoining scale bridge units positioned in weight-transmittal relationship to a load cell at adjoining corners of the scale bridge units.
Figure 23:
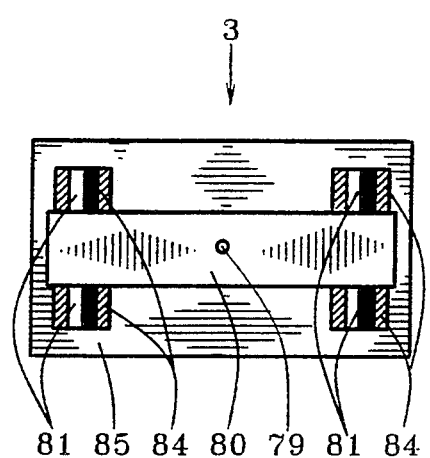
FIG. 23 is a top view of a load cell.

Referring to FIGS. 20 and 21, the central positioning post 8 is affixed to a linear positioning foundation 67 which is attachable to a linear composite foundation 68 on which a scale is placed for use. At each end-to-end or linear side of the central positioning post 8, a positioning bolt 9 is screwable into a linear positioning sleeve 69 having a lock screw 70 to prevent rotation in the absence of other thread-locking means. If used to prevent minimal linear impacting contact of use conditions, a linear resilient cushion 71 can be positioned between the central positioning post 8 and the positioning bolt 9, to either of which the cushion 71 can be attached. Thus, linear positioning and linear impact travel of the entire scale is provided centrally without requiring external wall sections as employed for conventional truck scales.

Figure 24:
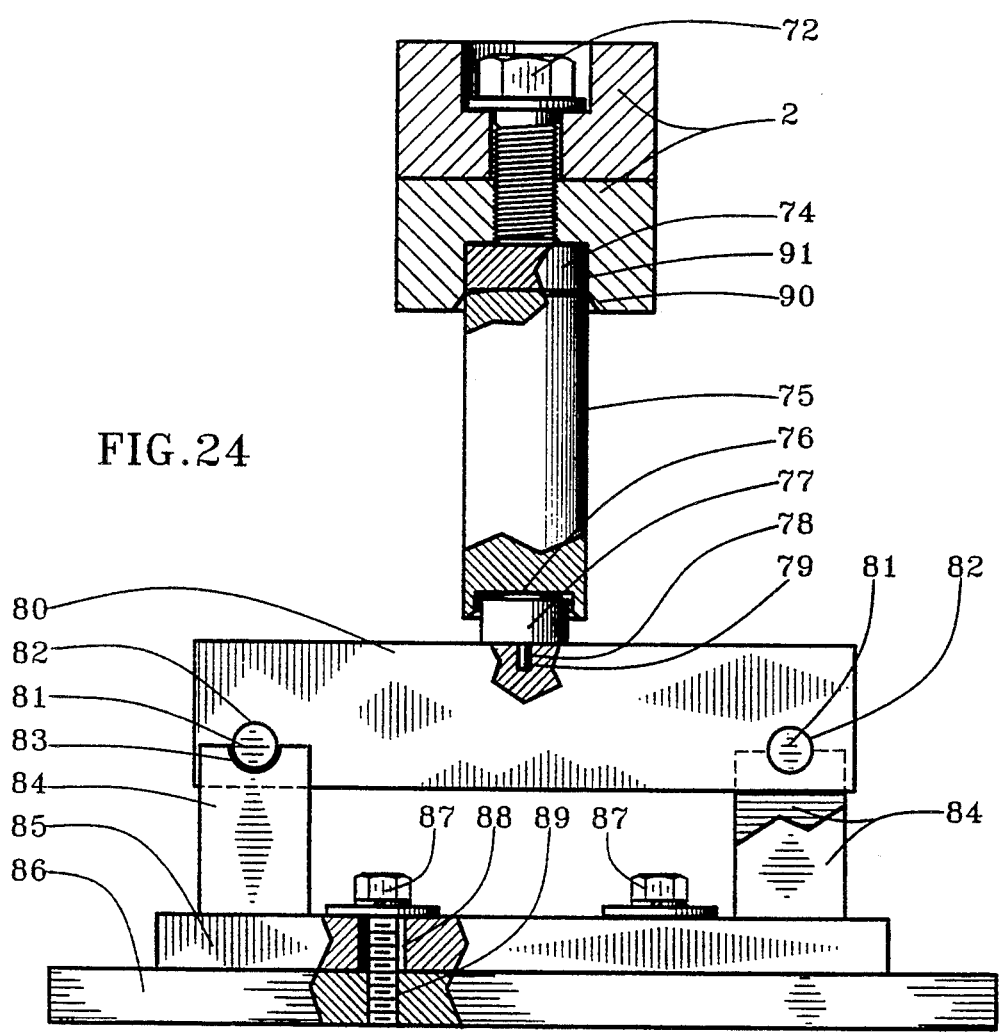
FIG. 24 is a cutaway end view of a load cell having a load pillar positioned in weight supportive relationship between the load cell and overlapped ends of bridge support members.
Figure 25:
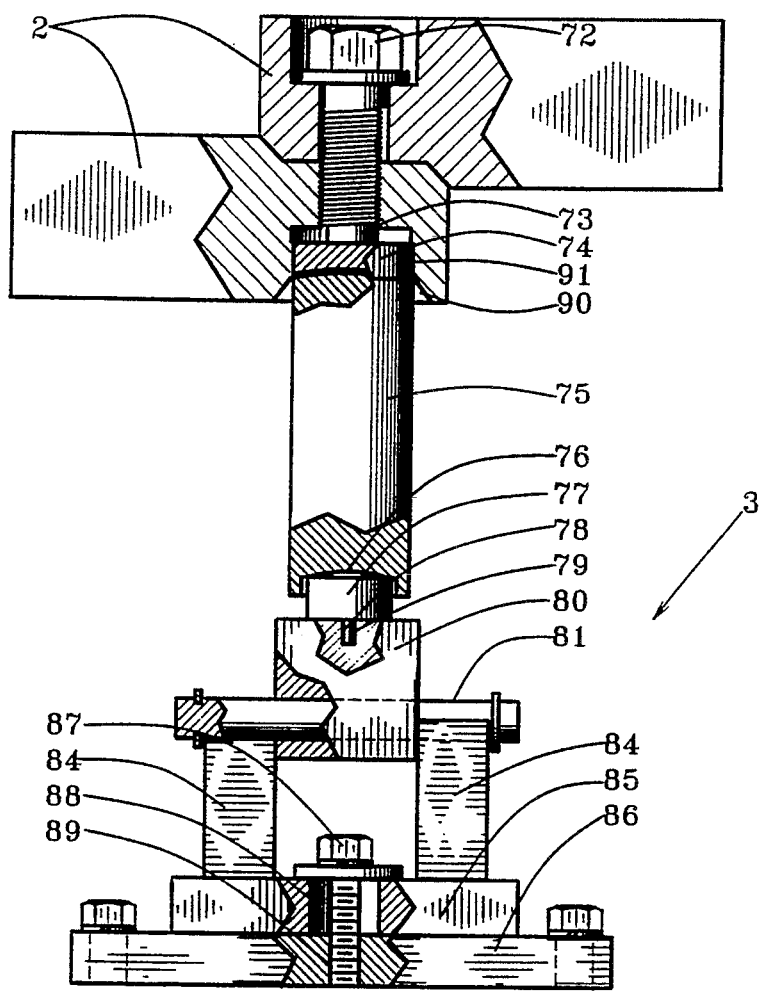
FIG. 25 is a cutaway side view of the FIG. 24 illustration.

Referring to FIGS. 22-27, bridge support members 2 attached to end-joint framework 92 are positioned vertically above load cells 3 with end positioning post and central positioning post 8 as described in relation to FIGS. 1-5 and 17-21. Above the load cells 3, a connecting bolt 72 is screwable into a bottom bridge support member 2 which is offset vertically below a top bridge support member 2 of an adjoining scale bridge unit. In a top bridge support member 2 is an un-threaded orifice slightly larger than a diameter of the connection bolt 72. The connection bolt 72 can have an un-threaded end 73 which is buttressed against a load-pillar cap 74 which have an arcuate surface in contact with a matching arcuate surface of a top end of a load pillar 75. A bottom end of the load pillar 75 can have an indented arcuate surface 76 which is positioned on a matching arcuate top surface of a load button 77. This provides a height-adjustment leveling option with the connection bolt 72 as shown in FIG. 25. Optionally, as shown in FIG. 24, the un-threaded end 73 of connection bold 72 can be eliminated, such that connection bold 72 does not contact the load-pillar cap 74. This is a preferred embodiment for construction not requiring height adjustment.

The load button 77 has a load-button shaft 78 that is positional in a load-button indentation 79 in a top surface of a strain-gauge beam 80. The strain-gauge beam 80 is supported by a support pin 81 inserted through a support pin orifice 82 in each end of the strain-gauge beam 80 at a position selectively below vertical center of the strain-gauge beam 80. The support pins 81 rest in a load-cell-saddle groove 83 in a top surface of a load-cell stand beam 84 at each side of each end of the strain-gauge beam 80. The load-cell stand beams 84 are extended vertically from a top surface of a load-cell base 85 that is attachable adjustably to load-cell foundation 86. Adjustable attachment of the load-cell base 85 to the load-cell foundation 86 can be provided by a fastener bolt 87 inserted through a base orifice 88 that is selectively larger in diameter than diameter of the fastener bolt 87 and screwed into a foundation bolt orifice 89.

Figures 26, 27:
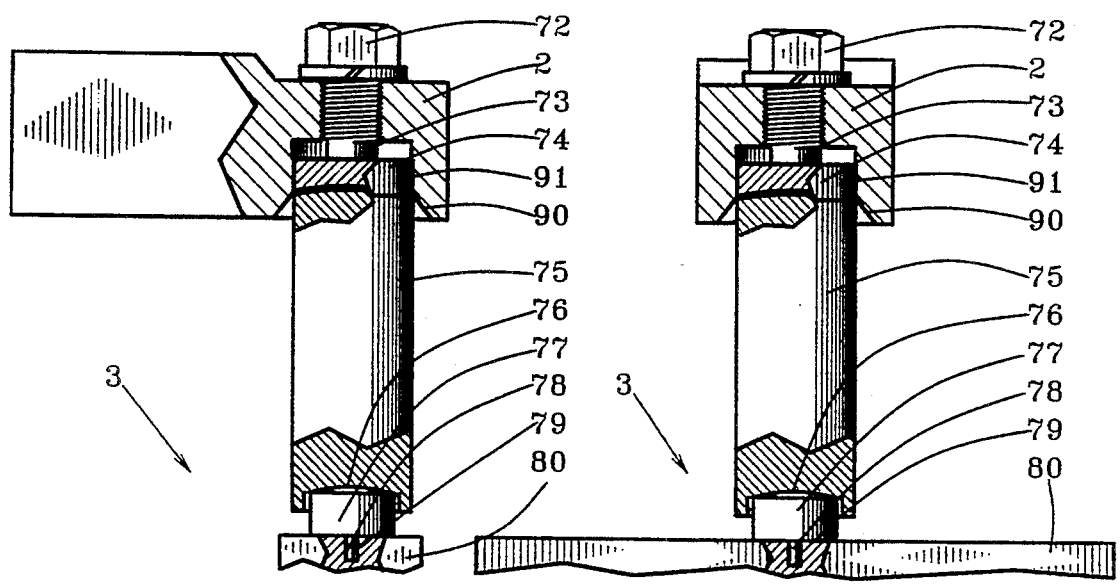
FIG. 26 is a cutaway side view of a single bridge support member positioned in relationship to a load button on a strain-gauge beam.
FIG. 27 is a cutaway end view of the FIG. 26 illustration.

At ends of scales, whether single-unit or multiple-unit scales, there is only one bridge support member 2 at each corner as shown in FIGS. 26 and 27. At scale ends, therefore, the connection bolt 72 can be screwed directly into the bridge support member 2 that rests directly on the load pillar 75 and load-pillar cap 74.

A beveled skirt 90 of a load-pillar indentation 91 can be provided to allow for slight travel of the scale bridge units.

Adjustability of load positioning at the described points lowers accuracy requirements in fabrication while increasing accuracy and reliability of scale positioning. This further decreases costs and improves performance capability.

A new and useful center-lock portable truck scale having been described, all such modifications, adaptations, substitutions of equivalents, combinations of components, applications and forms thereof as described by the following claims are included in this invention.

I claim:

1. A center-lock portable truck scale comprising:
 a scale bridge having parallel opposite sides joined linearly at said sides;
 a rigid top plate on each of said parallel opposite sides attached to beam framework;
 a central positioning post having walls, anchored to a base vertically below a central portion of the scale bridge and extended vertically to a position vertically below a top surface of the scale bridge;
 a positioning rod extendible from a positioning base on the beam framework of the scale bridge to a select distance from said walls of the central positioning post;
 an end positioning post having walls, anchored to a base vertically below an end portion of each end of the scale bridge and extended vertically to a position vertically below said top surface of the scale bridge;
 a lateral positioning rod extendible from a positioning base on the beam framework of the scale bridge to select distances from said walls of the end positioning post; at said each end of the scale bridge;
 an extensometer load cell positional on a load-cell base vertically below each end of the scale bridge proximate each corner of the scale bridge;

a bridge support member attached to each end of the beam framework and extended to a position vertically above said extensometer load cell, below said each end of the scale bridge; respectively; and a load pillar in weight-supportive relationship between said bridge support member attached to said each end of the beam framework; and the extensometer load cell vertically below said bridge support member, respectively.

2. A center-lock portable truck scale according to claim 1 wherein the parallel opposite sides are joined rigidly with side-joining members into one scale-bridge unit.

3. A center-lock portable truck scale according to claim 1 wherein the parallel opposite sides of the scale bridge are joinable in pivotable relationship by a plurality of hinges having means for maintaining rigidly parallel relationship between the parallel opposite sides and for positioning the parallel opposite sides rigidly in a common plane when unfolded from a transportation folded mode for installation and use at a scale site.

4. A center-lock portable truck scale according to claim 3 wherein the means for maintaining rigidly parallel relationship between the parallel opposite sides of the scale bridge and for positioning the parallel opposite sides rigidly in a common plane when unfolded from a transportation folded mode for installation and use at a scale site is comprised of:

a plurality of side-one hinge plates extended from a side-one portion of the hinge perpendicularly to an axis of the hinge, a plurality of side-two hinge plates extended from a side-two portion of the hinge perpendicularly to the axis of the hinge and juxtaposed alternately between the side-one hinge plates in snugly-slidable relationship;

a cylindrical hinge-pin orifice in each side-one hinge plate with concentric axes and equal inside diameters in each side-one cylindrical hinge-pin orifice;

a cylindrical hinge-pin orifice in each side-two hinge plate with concentric axes and equal inside diameters in each side-two cylindrical hinge-pin orifice;

a hinge pin insertable into the side-one hinge-pin orifices and into the side-two hinge-pin orifices when the side-one hinge-pin orifices and the side-two hinge-pin orifices are positioned in concentric relationship;

a lock-pin orifice in each side-one hinge plate that is concentric with a lock-pin orifice in each side-two hinge plate when the hinge pin is inserted into the side-one hinge-pin orifices and into the side-two hinge-pin orifices and the parallel opposite sides of the scale bridge attached to the respective hinge plates are positioned in a common plane; and a lock pin insertable into concentric lock-pin orifices of the juxtaposed side-one hinge plates and side-two hinge plates in a rotationally-locking relationship between the lock pin and the hinge pin in their respective hinge-pin orifices.

5. A center-lock portable truck scale according to claim 3 wherein the means for maintaining rigidly parallel relationship between the parallel opposite sides of the scale bridge and for positioning the parallel opposite sides rigidly in a common plane when unfolded from a transportation folded mode for installation and use at a scale site is comprised of:

at least one side-one hinge sleeve having a cylindrical bearing interior and being attachable to side one of the parallel opposite sides of the scale bridge by means of a side-one hinge base extended from the at-least-one side-one hinge sleeve to side one of the parallel opposite sides of the scale bridge;

at least two side-two hinge sleeves having a cylindrical bearing interior and attachable to side two of the parallel opposite sides of the scale bridge by means of a side-two hinge base extended from each side-two hinge sleeve to side two of the parallel opposite sides of the scale bridge;

a hinge pin snugly slidable in the at-least-one side-one hinge sleeve and in the at-least-two side-two hinge sleeves with the cylindrical bearing interiors of the respective hinge sleeves positioned in-line concentrically in standard hinge relationship;

a side-one lock-pin boss on an outside periphery of the at-least-one side-one hinge sleeve;

a side-two lock-pin boss on an outside periphery of each of the at-least-two side-two hinge sleeves;

a side-one lock-pin orifice in the at-least-one side-one lock-pin boss;

a side-two lock-pin orifice in each of the at-least-two side-two bosses positioned concentrically in-line with the side-one lock-pin orifice in the at-least-one side-one boss with the parallel opposite sides of the scale bridge positioned in a common plane; and a lock pin snugly slidable in the concentric at-least-one side-one lock-pin orifices and in the at-least two side-two lock-pin orifices with the parallel opposite sides of the scale bridge positioned in a common plane, the at-least-one side-one hinge-pin orifice and the at-least-two side-two hinge-pin orifices positioned concentrically and the at-least-one side-one lock-pin orifice and the at-least-two side-two lock pin orifices positioned concentrically.

6. A center-lock portable truck scale according to claim 3 wherein the means for maintaining rigidly parallel relationship between the parallel opposite sides of the scale bridge and for positioning the parallel opposite sides rigidly in a common plane when unfolded from a transportation folded mode for installation and use at a scale site is comprised of:

a plurality of side-one hinge sleeves having a cylindrical bearing interior and attachable to side one of the parallel opposite sides of the scale bridge by means of a side-one hinge base extended from each side-one hinge sleeve to side one of the parallel opposite sides of the scale bridge;

a plurality of side-two hinge sleeves having a cylindrical bearing interior and attachable to side two of the parallel opposite sides of the scale bridge by means of a side-two hinge base extended from each side-two hinge sleeve to side two of the parallel opposite sides of the scale bridge;

the side-one hinge sleeves and side-one hinge bases being positioned in juxtaposed relationship to the side-two hinge sleeves and side-two hinge bases;

a hinge pin snugly slidable in the side-one hinge sleeves and in the side-two hinge sleeves with the cylindrical bearing interiors of the respective hinge sleeves positioned in-line concentrically in standard hinge relationship;

a side-one lock-pin boss on an outside periphery of each of the side-one hinge sleeves;

a side-two lock-pin boss on an outside periphery of each of the side-two hinge sleeves;

a side-one lock-pin orifice in each of the side-one lock-pin bosses;

a side-two lock-pin orifice in each of the side-two bosses positioned concentrically in-line with the side-one lock-pin orifices in the side-one bosses with the parallel opposite sides of the scale bridge positioned in a common plane; and a lock pin snugly slidable in the concentric side-one lock-pin orifices and in the side-two lock-pin orifices with the parallel opposite sides of the scale bridge positioned in a common plane, the side-one hinge-pin orifices and the side-two hinge-pin orifices positioned concentrically and the side-one lock-pin orifices and the side-two lock-pin orifices positioned concentrically.

7. A center-lock portable truck scale according to claim 1 wherein the end-to-end positioning rod is a threaded bolt screwable into the positioning base on the beam framework at each scale-end-to-end side of the central positioning post with a bolt head of each of said threaded bolts positioned between the central positioning post and the respective positioning bases at opposite scale-end-to-end sides of the positioning post, each of said bolt heads being in a linearly end-to-end bumper relationship between the truck scale and the central positioning post.

8. A center-lock portable truck scale according to claim 7 and further comprising:
a selectively thick resilient member positional as a bumper cushion between the central positioning post and the bolt heads.

9. A center-lock portable truck scale according to claim 1 wherein the side-to-side positioning rod is a threaded bolt screwable into the positioning base on the beam framework at each side of the end positioning post with a bolt head of each of said threaded bolts positioned between the end positioning post and the respective positioning bases at opposite sides of the end positioning post, each of said bolt heads being in a side-to-side bumper relationship between the truck scale and the end positioning post.

10. A center-lock portable truck scale according to claim 9 and further comprising:
a selectively thick resilient member positional as a bumper cushion between the end positioning post and the bolt heads.

11. A center-lock portable truck scale according to claim 1 wherein the beam framework is a plurality of end-to-end structural beams extended from end-to-end of the scale bridge and a plurality of side-to-side structural beams positioned at right angles to and between the end-to-end structural beams.

12. A center-lock portable truck scale according to claim 1 wherein the beam framework is a plurality of side-to-side structural beams extended from side-to-side of the scale bridge and a plurality of end-to-end structural beams positioned at right angles to and interspaced between the side-to-side structural beams.

13. A center-lock portable truck scale according to claim 1 and further comprising:
an end-joint framework at each end of the scale bridge having an end cross member attached to the structural framework; and
a plurality of attachment members extended horizontally perpendicular from each cross member.

14. A center-lock portable truck scale according to claim 13 wherein the bridge support member is extended horizontally perpendicular from each cross member proximate each corner of the scale bridge.

15. A center-lock portable truck scale according to claim 1 wherein the load-cell base is a load-cell saddle having a base beam positional horizontally on a foundation below each bridge support member, a vertical saddle beam proximate each end of each base beam, and a saddle groove in a top surface of each vertical saddle beam sized and shaped to receive a load-cell support pin.

16. A center-lock portable truck scale according to claim 15 wherein the extensometer load cell is a strain-gauge beam having a load-cell support orifice positioned selectively below a center of each end of the strain-gauge beams and extended from-side-to-side of the strain-gauge beam and further comprising:
a load-cell support pin positioned in each load-cell support orifice, extended from each side of the strain-gauge beams and positional in each saddle groove in the top surface of each vertical saddle beam.

17. A center-lock portable truck scale comprising:
a plurality of scale bridge units having parallel opposite sides joined linearly at said sides and having adjoining ends joined vertically pivotal and horizontally rigid;
a rigid top plate on each of said parallel opposite sides of each said scale bridge units attached to beam framework;
a central positioning post having walls, anchored to a base vertically below a central adjoining-end portion of the scale bridge and extended vertically to a position proximate a top surface of the scale bridge;
a positioning member extendible from a positioning base on said beam framework of said adjoining ends of two adjoining of said plurality of scale bridge units to select distances from walls of the central positioning post;
an end positioning post having walls, anchored to a base vertically below an end portion of a scale bridge unit at opposite ends of the scale and extended vertically to said position proximate a top surface of the scale;
a lateral positioning member extendible from a positioning base on beam framework at said opposite ends of the scale to select distances from walls of said end positioning post;
an extensometer load cell positional on a load-cell base vertically below each adjoining end corner of adjoining ends of said scale bridge units of the scale and vertically below each end corner of the scale;
a bridge support member attached to each end of beam framework of each of said scale bridge units and extended to positions vertically above said extensometer load cell, below said each adjoining end corner of said scale bridge units and below said each end corner of the scale respectively; and
a load pillar in weight-supportive relationship between each bridge support member and the load cell vertically below each bridge support member, respectively.

18. A center-lock portable truck scale according to claim 17 wherein the parallel opposite sides of the scale bridge units are joined rigidly into separate scale-bridge units.

19. A center-lock portable truck scale according to claim 17 wherein the parallel opposite sides of the scale bridge units are joinable in vertically pivotable relationship by a plurality of hinges having means for maintaining rigidly parallel relationship between the parallel opposite sides and for positioning the parallel opposite sides rigidly in a common plane when unfolded from a transportation folded mode for installation and use at a scale site.

20. A center-lock portable truck scale according to claim 19 wherein the means for maintaining rigidly parallel relationship between the parallel opposite sides of the scale bridge units and for positioning the parallel opposite sides rigidly in a common plane when unfolded from a transportation folded mode for installation and use at a scale site is comprised of:
- a plurality of side-one hinge plates extended from a side-one portion of the hinge perpendicularly to an axis of the hinge,
- a plurality of side-two hinge plates extended from a side-two portion of the hinge perpendicularly to the axis of the hinge and juxtaposed alternately between the side-one hinge plates in snugly-slidable relationship;
- a cylindrical hinge-pin orifice in each side-one hinge plate with concentric axes and equal inside diameters in each side-one cylindrical hinge-pin orifice;
- a cylindrical hinge-pin orifice in each side-two hinge plate with concentric axes and inside diameters in each side-two cylindrical hinge-pin orifice that are equal in diameter and equal to the inside diameter of the side-one cylindrical hinge-pin orifices;
- a hinge pin insertable into the side-one hinge-pin orifices and into the side-two hinge-pin orifices when the side-one hinge-pin orifices and the side-two hinge-pin orifices are positioned in concentric relationship;
- a lock-pin orifice in each side-one hinge plate that is concentric with a lock-pin orifice in each side-two hinge plate when the hinge pin is inserted in the side-one hinge-pin orifices and into the side-two hinge-pin orifices and the parallel opposite sides of scale bridge units attached to the respective hinge plates are positioned in a common plane; and
- a lock pin insertable into concentric lock-pin orifices of the juxtaposed side-one hinge plates and side-two hinge plates in a rotationally-locking relationship between the lock pin and the hinge pin in their respective hinge-pin orifices.

21. A center-lock portable truck scale according to claim 19 wherein the means for maintaining rigidly parallel relationship between the parallel opposite sides of the scale bridge units and for positioning the parallel opposite sides rigidly in a common plane when unfolded from a transportation folded mode for installation and use at a scale site is comprised of:
- at least one side-one hinge sleeve having a cylindrical bearing interior and being attachable to side one of the parallel opposite sides of each scale bridge unit by means of a side-one hinge base extended from the at-least-one side-one hinge sleeve to side one of the parallel opposite sides of each scale bridge unit;
- a plurality of side-two hinge sleeves having a cylindrical bearing interior and attachable to side two of the parallel opposite sides of each scale bridge unit by means of a side-two hinge base extended from each side-two hinge sleeve to side two of the parallel opposite sides of each scale bridge unit;
- a hinge pin snugly slidable in the at-least-one side-one hinge sleeve and in the side-two hinge sleeves with the cylindrical bearing interiors of the respective hinge sleeves positioned in-line concentrically in standard hinge relationship;
- a side-one lock-pin boss on an outside periphery of the at-least-one side-one hinge sleeve;
- a side-two lock-pin boss on an outside periphery of each of the side-two hinge sleeves;
- a side-one lock-pin orifice in the at-least-one side-one lock-pin boss;
- a side-two lock-pin orifice in each of the side-two bosses positioned concentrically in-line with the side-one lock-pin orifice in the at-least-one side-one boss with the parallel opposite sides of separate scale bridge units positioned in a common plane; and
- a lock pin snugly slidable in the concentric at-least-one side-one lock-pin orifices and in the at-least two side-two lock-pin orifices with the parallel opposite sides of the separate scale bridge units positioned in a common plane, the at-least-one side-one hinge-pin orifice and the side-two hinge-pin orifices positioned concentrically and the at-least-one side-one lock-pin orifice and the side-two lock pin orifices positioned concentrically.

22. A center-lock portable truck scale according to claim 19 wherein the means for maintaining rigidly parallel relationship between the parallel opposite sides of the separate scale bridge units and for positioning the parallel opposite sides rigidly in a common plane when unfolded from a transportation folded mode for installation and use at a scale site is comprised of:
- a plurality of side-one hinge sleeves having a cylindrical bearing interior and being attachable to side one of the parallel opposite sides of the scale bridge units by means of a side-one hinge base extended from each side-one hinge sleeve to side one of the parallel opposite sides of each scale bridge unit;
- a plurality of side-two hinge sleeves having a cylindrical bearing interior and being attachable to side two of the parallel opposite sides of the scale bridge units by means of a side-two hinge base extended from each side-two hinge sleeve to side two of the parallel opposite sides of each scale bridge unit;
- the side-one hinge sleeves and side-one hinge bases being positioned in juxtaposed relationship to the side-two hinge sleeves and side-two hinge bases;
- a hinge pin snugly slidable in the side-one hinge sleeves and in the side-two hinge sleeves with the cylindrical bearing interiors of the respective hinge sleeves positioned in-line concentrically in standard hinge relationship;
- a side-one lock-pin boss on an outside periphery of each of the side-one hinge sleeves;
- a side-two lock-pin boss on an outside periphery of each of the side-two hinge sleeves;
- a side-one lock-pin orifice in each of the side-one lock-pin bosses;
- a side-two lock-pin orifice in each of the side-two bosses positioned concentrically in-line with the side-one lock-pin orifices in the side-one bosses with the parallel opposite sides of the scale bridge units positioned in a common plane; and
- a lock pin snugly slidable in the concentric side-one lock-pin orifices and in the side-two lock-pin orifices with the parallel opposite sides of the scale bridge units positioned in a common plane, the side-one hinge-pin orifices and the side-two hinge-pin orifices positioned concentrically and the side-one lock-pin orifices and the side-two lock pin orifices positioned concentrically.

23. A center-lock portable truck scale according to claim 17 wherein the end-to-end positioning member is a threaded bolt screwable into the positioning base on the beam framework at each scale-end-to-end side of the central positioning post with a bolt head of each of said threaded bolts positioned between the central positioning post and the respective positioning bases at opposite scale-end-to-end sides of the positioning post, each of said bolt heads being in a linearly end-to-end bumper relationship between the truck scale and the central positioning post.

24. A center-lock portable truck scale according to claim 23 and further comprising:
a selectively thick resilient member positional as a bumper cushion between the central positioning post and the bolt heads.

25. A center-lock portable truck scale according to claim 17 wherein the side-to-side positioning member is a threaded bolt screwable into the positioning base on the beam framework at each side of the end positioning post with a bolt head of each of said threaded bolts positioned between the end positioning post and the respective positioning bases at opposite sides of the end positioning post, each of said bolt heads being in a side-to-side bumper relationship between the truck scale and the end positioning post.

26. A center-lock portable truck scale according to claim 25 and further comprising:
a selectively thick resilient member positional as a bumper cushion between the end positioning post and the bolt heads.

27. A center-lock portable truck scale according to claim 17 wherein the beam framework is a plurality of end-to-end structural beams extended from end-to-end of separate scale bridge units and a plurality of side-to-side structural beams positioned at right angles to and between the end-to-end structural beams.

28. A center-lock portable truck scale according to claim 17 wherein the beam framework is a plurality of side-to-side structural beams extended from side-to-side of separate scale bridge units and a plurality of end-to-end structural beams positioned at right angles to and between the side-to-side structural beams.

29. A center-lock portable truck scale according to claim 17 and further comprising:
an end-joint framework at each end of separate scale bridge units having an end cross member attached to the structural framework; and
a plurality of attachment members extended horizontally perpendicular from each cross member.

30. A center-lock portable truck scale according to claim 29 wherein the bridge support member is extended horizontally perpendicular from each cross member proximate each corner of the scale bridge.

31. A center-lock portable truck scale according to claim 30 wherein terminal end portions of the bridge support members extended horizontally perpendicular from cross members of an end-one of scale bridge units are positioned selectively higher vertically than terminal end portions extended horizontally perpendicular from cross members of an end-two of scale bridge units, a bottom surface of the terminal end portions of the bridge support members extended from the cross members of ends-one scale bridge units being positional in selectively-slidable and selectively swivelable contact with a top surface of the terminal end portions of the bridge support members extended from ends-two of scale bridge units in weight-transmittal relationship between adjoining bridge scale units and the load pillar proximate corners of the adjoining bridge scale units, and a fastener in selectively swivelable fastening relationship between the load pillars and the terminal end portions of the ends-one and ends-two of the adjoining scale bridge units, respectively, at each adjoining corner of the adjoining scale bridge units.

32. A center-lock portable truck scale according to claim 17 wherein the load-cell base is a load-cell saddle having a base beam positional horizontally on a foundation below each bridge support member, a vertical saddle beam proximate each end of each base beam, and a saddle groove in a top surface of each vertical saddle beam sized and shaped to receive a load-cell support pin.

33. A center-lock portable truck scale according to claim 32 wherein the extensometer load cell is a strain-gauge beam having a load-cell support orifice positioned selectively below a center of each end of the strain-gauge beams and extended from-side-to-side of the strain-gauge beams and further comprising:
a load-cell support pin positioned in each load-cell support orifice, extended from each side of the strain-gauge beams and positional in each saddle groove in the top surface of each vertical saddle beam.

34. A center-lock portable truck scale comprising:
a plurality of scale bridge units having parallel opposite sides with the sides joinable in vertically pivotable relationship by a plurality of hinges having means for maintaining rigidly parallel relationship between the parallel opposite sides and for positioning the parallel opposite sides rigidly in a common plane when unfolded from a transportation folded mode for installation and use at a scale site;
adjoining ends of the scale bridge units joined vertically pivotal and horizontally rigid;
a rigid top plate on each parallel opposite side of separate scale bridge units attached to beam framework;
a central positioning post having walls, anchored to a base vertically below a central adjoining-end portion of the scale and extended vertically to a position proximate a top surface of the scale;
a positioning bolt extendible selectively from a positioning base on beam framework of said ends of two adjoining of said scale bridge units with a bolt head of the positioning bolt positional at select distances from said walls of the central positioning post;
an end positioning post having walls, anchored to a base vertically below an end portion of one of said scale bridge units at each end of the scale and extended vertically to a position proximate a top surface of said each end of the scale;
a lateral positioning bolt extendible from a positioning base on beam framework at said each end of the scale with a bolt head positional at select distances from walls of each said end positioning post at said each end of the scale;
a strain-gauge load cell positional on a load-cell base vertically below each adjoining end corner of said adjoining ends of scale bridge units of said the scale bridge and vertically below each end corner of the scale bridge;
a bridge support member attached to each end of beam framework of separate scale bridge units and extended to positions vertically above each load cell, respectively;

a load pillar in weight-supportive relationship between each bridge support member and the strain-gauge load cell vertically below each bridge support member, respectively;

a plurality of side-one hinge attached to one of said parallel sides plates extended from a side-one portion of the hinge perpendicularly to an axis of the hinge, a plurality of side-two hinge plates extended from a side-two portion of the hinge attached to another one of said parallel sides perpendicularly to the axis of the hinge and juxtaposed alternately between the side-one hinge plates in snugly-slidable relationship;

a cylindrical hinge-pin orifice in each side-one hinge plate with concentric axes and equal inside diameters in each side-one cylindrical hinge-pin orifice;

a cylindrical hinge-pin orifice in each side-two hinge plate with concentric axes and inside diameters in each side-two cylindrical hinge-pin orifice that are equal in diameter and equal to the inside diameter of the side-one cylindrical hinge-pin orifices;

a hinge pin insertable into the side-one hinge-pin orifices and into the side-two hinge-pin orifices when the side-one hinge-pin orifices and the side-two hinge-pin orifices are positioned in concentric relationship;

a lock-pin orifice in each side-one hinge plate that is concentric with a lock-pin orifice in each side-two hinge plate when the hinge pin is inserted in the side-one hinge-pin orifices and into the side-two hinge-pin orifices and the parallel opposite sides of scale bridge units attached to the respective hinge plates are positioned in a common plane; and a lock pin insertable into concentric lock-pin orifices of the juxtaposed side-one hinge plates and side-two hinge plates in a rotationally-locking relationship between the lock pin and the hinge pin in their respective hinge-pin orifices.

35. A center-lock portable truck scale according to claim 34 and further comprising:
a selectively thick resilient member positional as a bumper cushion between the central positioning post and the respective bolt heads and between the end positioning post and the respective bolt heads.

36. A center-lock portable truck scale according to claim 34 and further comprising:
an end-joint framework at each end of separate scale bridge units having an end cross member attached to the structural framework; and
a plurality of attachment members extended horizontally perpendicular from each cross member.

37. A center-lock portable truck scale according to claim 36 wherein terminal end portions of the bridge support members extended horizontally perpendicular from cross members of an end-one of scale bridge units are positioned selectively higher vertically than terminal end portions extended horizontally perpendicular from cross members of an end-two of scale bridge units, a bottom surface of the terminal end portions of the bridge support members extended from the cross members of ends-one of scale bridge units being positional in selectively-slidable and selectively swivelable contact with a top surface of the terminal end portions of the bridge support members extended from ends-two of scale bridge units in weight-transmittal relationship between adjoining bridge scale units and the load pillar proximate corners of the adjoining bridge scale units, and a fastener in selectively swivelable fastening relationship between the load pillars and the terminal end portions of the ends-one and ends-two of the adjoining scale bridge units, respectively, at each adjoining corner of the adjoining scale bridge units.

38. A center-lock portable truck scale according to claim 34 wherein the load-cell base is a load-cell saddle having a base beam positional horizontally on a foundation below each bridge support member, a vertical saddle beam proximate each end of the base beam, and a saddle groove in a top surface of each vertical saddle beam sized and shaped to receive a load-cell support pin.

39. A center-lock portable truck scale according to claim 38 and further comprising a strain-gauge beam having a load-cell support orifice positioned selectively below a center of each end of each strain-gauge beam and extended from-side-to-side of each strain-gauge beam and further comprising:
a load-cell support pin positioned in each load-cell support orifice, extended from each side of the strain-gauge beam and positional in each saddle groove in the top surface of each vertical saddle beam.

40. A scale-bridge fold hinge comprised of:
a plurality of side-one hinge plates having a cylindrical bearing interior and being attachable to side one of parallel opposite sides of scale bridge units by means of a side-one hinge base extended from each side-one hinge plate to side one of the parallel opposite sides of separate scale bridge units;
a plurality of side-two hinge plates having a cylindrical bearing interior and being attachable to side two of the parallel opposite sides of the scale bridge units by means of a side-two hinge base extended from each side-two hinge plate to side two of the parallel opposite sides of separate scale bridge units;
the side-one hinge plates and side-one hinge bases being positioned in juxtaposed relationship to the side-two hinge plates and side-two hinge bases;
a hinge pin snugly slidable in the side-one hinge plates and in the side-two hinge plates with the cylindrical bearing interiors of the respective hinge plates positioned in-line concentrically in standard hinge relationship;
contacting intermediate sides of the hinge plates being in slidable contact;
a side-one lock-pin boss on an outside periphery of each of the side-one hinge plates;
a side-two lock-pin boss on an outside periphery of each of the side-two hinge plates;
a side-one lock-pin orifice in each of the side-one lock-pin bosses;
a side-two lock-pin orifice in each of the side-two bosses positioned concentrically in-line with the side-one lock-pin orifices in the side-one bosses with the parallel opposite sides of the scale bridge units positioned in a common plane; and
a lock pin snugly slidable in the concentric side-one lock-pin orifices and in the side-two lock-pin orifices with the parallel opposite sides of the scale bridge units positioned in a common plane, with the side-one hinge-pin orifices and the side-two hinge-pin orifices positioned concentrically and with the side-one lock-pin orifices and the side-two lock-pin orifices positioned concentrically.

* * * * *